United States Patent [19]

Alexander et al.

[11] Patent Number: 4,533,277

[45] Date of Patent: Aug. 6, 1985

[54] IN-PRESSING PLANAR EDGE JOINER CLAMP

[76] Inventors: Roy Alexander, 1575 Oak Ave., Evanston, Ill. 60201; Robert Bokum, 19 Ledge Rd., Old Greenwich, Conn. 07670

[21] Appl. No.: 376,946

[22] Filed: May 11, 1982

Related U.S. Application Data

[63] Continuation of Ser. No. 45,314, Jun. 4, 1979, abandoned.

[51] Int. Cl.³ .................................................. F16B 2/00
[52] U.S. Cl. .................................. 403/408.1; 403/312; 411/544
[58] Field of Search ................ 411/544; 403/312, 408; 52/584

[56] References Cited

U.S. PATENT DOCUMENTS

| | | | |
|---|---|---|---|
| 277,076 | 5/1883 | Stuart | 403/283 |
| 1,430,259 | 9/1922 | Radelet et al. | 411/486 |
| 1,724,394 | 8/1929 | Chamberlain | 403/281 |
| 2,258,822 | 10/1941 | Sturgiss et al. | 411/368 |
| 3,099,931 | 8/1963 | Ferdinand | 411/15 |
| 3,585,771 | 6/1971 | Pinniger | 52/584 X |

FOREIGN PATENT DOCUMENTS

| | | | |
|---|---|---|---|
| 72564 | 4/1970 | German Democratic Rep. | 52/584 |
| 229396 | 2/1925 | United Kingdom | 403/312 |
| 280832 | 11/1927 | United Kingdom | 52/584 |
| 301463 | 4/1971 | U.S.S.R. | 52/584 |

Primary Examiner—Andrew V. Kundrat
Attorney, Agent, or Firm—Richard A. Joel

[57] ABSTRACT

This invention is directed to a fastener for securely joining two or more abutting flat panels together along their edges without the necessity of piercing any of the panels or disassembling the connection assembly. The fastener comprises first and second directionally oriented compressible parts of resilient material which are pressed against opposing sides of the panels and means for applying a mechanical force to produce said pressing action causing a partial shape change of the opposing frustoconical compressible parts. The force applying means comprises an elongated threaded member and a body portion extending through an aperture in each compressible part with a wing nut mounted on the extending ends thereof to anchor the parts together. Due to their particular shape, orientation and gripping properties, the compressible parts transfer a large portion of the pressure applied on the opposing exterior sides of the compressible members to directions parallel to the planar surface to firmly join the edge of one panel against the edge of the other panel in the case of edge to edge flush joining, or in a single direction designed for support of the panels by the fastener.

3 Claims, 8 Drawing Figures

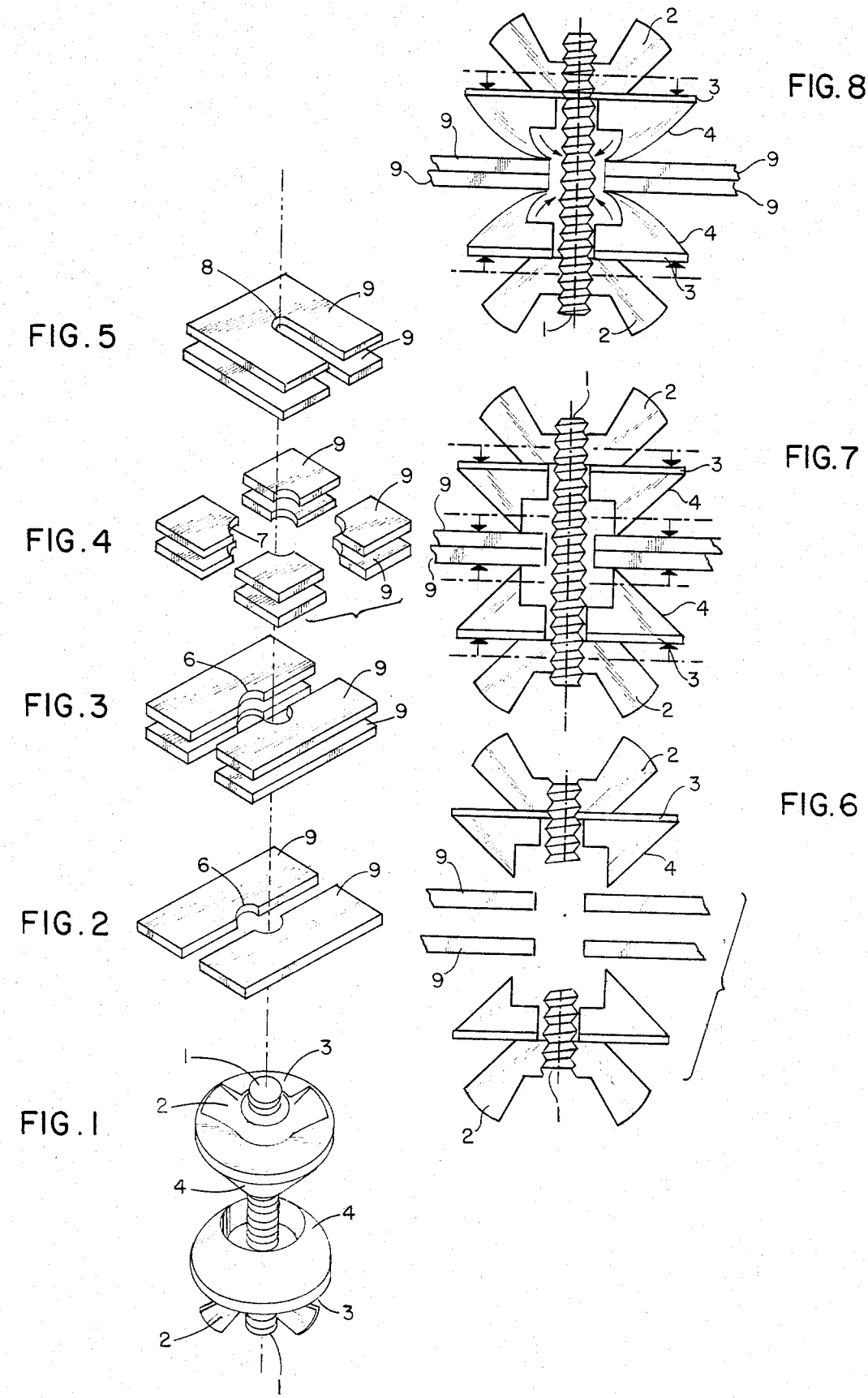

IN-PRESSING PLANAR EDGE JOINER CLAMP

This application is a continuation of Ser. No. 045,314 filed June 4, 1979 and now abandoned.

This invention pertains to plane joining devices and more particularly to a deforming planar clamp holding two or more planar edges and/or faces together.

The device of the invention is useful in a wide variety of temporary or permanent joining applications. The main object of the invention is to grip the surfaces of adjacent planes 9, FIG. 7, and draw them together FIG. 8 by application of a unidirectional pressure FIG. 8. This drawing together is achieved by deformation of the main body member to divert the force of the pressure 90° to parallel the surface of the planes to be joined, and to direct this pressure to draw together adjacent edges of abutting segments whose edges are centered on the joiner.

Other objects and advantages of the invention will become apparent as the description proceeds with reference to the following drawings wherein;

DETAILED DESCRIPTION OF THE INVENTION

FIG. 1 is a perspective view of the fastener comprising the invention;

FIG. 2 is a perspective view of two pieces of planar material aligned and notched for joining edge to edge;

FIG. 3 is a perspective view of four pieces of planar material aligned and notched for joining at their corners edge to edge and face to face;

FIG. 4 is a perspective view of eight pieces of planar material aligned and notched for joining at their corners edge to edge and face to face;

FIG. 5 is a perspective view of two pieces of planar material aligned and deeply notched for joining adjacent panels face to face;

FIG. 6 is a cutaway plan view of FIG. 1 illustrating the fastener in an open position and showing four pieces of planar material as in FIG. 3, aligned and notched for joining edge to edge and face to face;

FIG. 7 is a sectional view related to FIG. 6 with the in-pressing process begun in the direction shown by the arrows, and FIG. 8 is a sectional view related to FIG. 6 and FIG. 7 with the in-pressing process completed and the planar surfaces firmly in place.

The invention FIG. 1 has the function of clamping two or more flat planes together at or near one edge FIGS. 2, 3, 4, 5.

It operates to press together edges, sides, or both in a firm and secure fashion without the necessity of piercing any of the panels or disassembly of the clamp in any way or the use of any tools other than two hands.

The panels shown are notched for maximum effectiveness due to the bolt employed in the illustrated model, but the action functions without this clearance with the bolt and with other forms of pressure applications.

The clamp shown consists of a threaded metal rod 1 with wing nuts 2 on both ends FIG. 1. Between these, and supplementary stiff washers 3 that may be required to distribute pressure evenly, are two frustoconical body members 4 mounted about the rod of normally shape retaining yet resiliently deformable material, the surface of which is adhesive under pressure. The frustoconical members 4 have a central aperture which receives the rod. The smaller end of each of these frustoconical body members are facing each other FIGS. 1 and 7.

The joiner is placed with the threaded rod between the conical body members into the notch 6 or slot 8 in the material 9 to be joined and the pressure induced by the turning of the wing nuts brings the small end of the cone in contact with the surface of the material as shown in FIG. 7.

When joining 2 pieces of material 9 edge to edge FIG. 2 the cone ring is in contact with both sides of both pieces 9.

When joining 4 pieces of material edge to edge and face to face, FIGS. 3 and 6, the cone ring is in contact with one side of all pieces 9.

When joining 8 or more pieces edge to edge and face to face, FIG. 4, the cone ring is in contact with one corner of the face of each piece 9.

When joining 2 pieces face to face FIG. 5 the cone ring is in contact with one face of each piece and the notch 8 will be deep enough to bring at least the entire narrow end of the cone within the edge of the material FIG. 5.

After the material in any of the cases above is in contact and the cone rings are snug against them as in FIG. 7, several more turns are made on the wing nut to secure the clamp as in FIG. 8. Under this increased pressure, the small end of the conical flexible member, originally triangular in section, grips the material firmly and deforms to turn inward and flatten as it presses against the material 9. The nature of the shape forces the in-pressing edge of the conical member towards the center of the hole around the center point of the unidirectional pressure establishing a pushing together thereby inducing an extraordinarily strong pressing of the edge of one piece against the edge of the other while retaining the face to face clamping characteristics of a simple bolt and nut FIG. 7 which serves as an alignment device valuable during the application of the pressure on the edges.

The pressing together of the edges of the material FIG. 5 is not a function of the joining face to face only but does align the planes and serves to secure the clamp in place.

The size and shape of the compression member may vary according to the available or desirable portion of planar material to be acted upon and/or the degree of retention required. The degree of retention may also require greater mechanical advantage up to and including application of motor drives, cams, and various forms of mechanical linkage that operate through the central threaded rod, a compression belt for tube joining or even a bypass arm such as a C-clamp. The patent is not to be limited by size, or type or amount of pressure applied, and rests primarily upon the in-pressing of the small end of the double triangular section member when unidirectional force is applied to the outside either permanently or temporarily.

What is claimed is:

1. A reusable panel fastener for joining panels, having adjacent notches to receive said fasteners, in an edge to edge relationship comprising:
   an elongated threaded rod extending through adjacent notches in said panels and extending beyond said panels,
   first and second frustoconical members of a resilient material each having a central aperture extending axially therethrough mounted with the smaller surfaces in an opposing relationship contacting said panels and a circumferential supporting surface at the larger outer end thereof, a pair of flat metal washers, each having a central aperture minimally larger than the diameter of the threaded rod and mounted against the circumferential supporting surface of each frustoconical member, and adjustable mounting means threaded onto both ends of the rod in contact with the washers to secure adjacent panels together by forcing said frustoconical members against said panels.

2. A reusable panel fastener in accordance with claim 1 wherein:

the outer walls of the frustoconical members taper inwardly at a 45° angle to the central aperture forming a thin circular edge for contact with said panels wherein said edges grip the panels and under further pressure from the adjustable mounting means change shape towards the axis of the panels to apply positive pressure of one panel's edge against the edge of an adjacent panel.

3. A reusable panel fastener in accordance with claim 2 wherein:

the adjustable mounting means comprises a wing nut and the threaded rod comprises a bolt, and said adjacent panels each comprise a plurality of separate panels mounted face to face.

* * * * *